July 17, 1934.  F. W. BRACKETT  1,967,050
SCREENING AND FILTERING APPARATUS
Filed Jan. 18, 1932
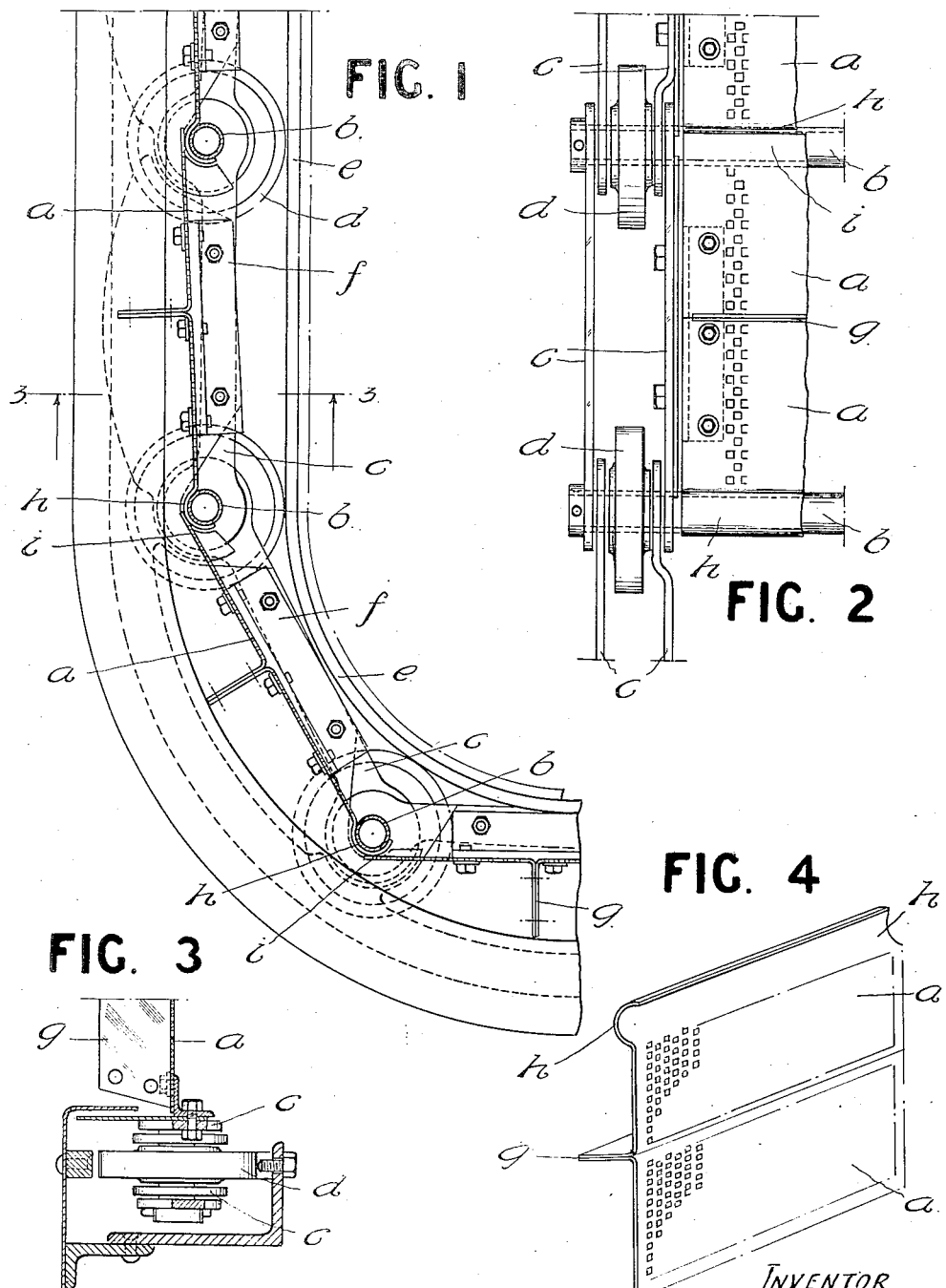
INVENTOR
FRANCIS WHITWELL BRACKETT
BY Arthur Wm Nelson
ATTY.

Patented July 17, 1934

1,967,050

UNITED STATES PATENT OFFICE 1,967,050

SCREENING AND FILTERING APPARATUS

Francis Whitwell Brackett, Colchester, England

Application January 18, 1932, Serial No. 587,282
In Great Britain January 28, 1931

9 Claims. (Cl. 210—175)

The invention refers to apparatus for screening and filtering liquid containing solid matter in suspension, or for sieving or screening more or less dry finely divided materials, of the kind in which a number of perforated or mesh plates, of metal or other suitable strong and rigid material are interconnected with each other by transverse bars arranged between sprocket chains which are driven by a suitable chain wheel or wheels. The transverse bars or rods are provided at their ends with rollers for working against fixed guide surfaces and so taking the thrust which the water puts on the screening band.

The object of the present invention is to improve the construction of the perforated or mesh plates.

In accordance with the invention the screen plate is made in sections, preferably in two halves, each having a terminal flange at least at one end, and the sections are secured together by these flanges by assembling the latter face to face and riveting or otherwise securing them together. The assembled flanges then form stiffening bars projecting on one side (i. e. the outer side) of the screen plate and running transversely across the plate.

The plates may be secured to the side chains by angle pieces bolted to the plates and to the links, or by any like means.

In the appended drawing:—

Figure 1 is a sectional side elevation of a portion of a screen with the invention applied.

Figure 2 is a front elevation of a portion thereof.

Figure 3 is a cross-section on line 3—3 of Figure 1.

Figure 4 is a perspective view of a screen-plate.

In the drawing $a$ represents the perforated screen plates; $b$ the transverse bars arranged between the links $c$ of a chain. $d$ are the thrust-rollers at the ends of the bars $b$, and $e$ the fixed guide surfaces on which the rollers work. $f$ are angle or other suitable brackets bolted to the links $c$ and carrying the plates $a$. The screen plates $a$ are made in two halves with right angle flanges $g$ at their meeting edges. These flanges are secured together by rivets or other means and form stiffening bars across the screen plate on the side which will be outermost in the screen.

In Figure 1 the few links of the screen band which are illustrated are on the descending part of the screen. Each screen plate in this illustrated embodiment has one half lipped over as at $h$ at the leading end of the plate, which will be uppermost on the ascending side of the screen band in order to seat against the bar $b$ and form a sealing lip thereon.

When the plates $a$ are assembled on the chains the sealing lip $h$ at the leading end of each plate seats against a cross bar $b$ or tube between the chains and the other or trailing edge $i$ rests on the outer contour of the lip $h$ of the next succeeding plate.

I claim:

1. Screening and filtering apparatus in which a number of perforated metal plates are assembled upon chains for driving by suitable means to form a travelling band wherein the plates are formed in sections each having a deep terminal flange at least at one end of the section and one of said sections having an imperforate curved over portion at its other end; two of said flanges being secured together to connect two sections into a plate and to form a stiffening rib across said perforate plate between its ends and the imperforate curved over portion serving as a seating and sealing lip against portions of the travelling band.

2. Screening and filtering apparatus in which a pair of endless chains are distanced from each other but connected together at intervals by transverse bars which connect the links of the chains to form an endless travelling band upon the links or sides to which a number of perforated metal screening plates are secured, wherein the plates are each formed of two sections having deep substantially right angle flanges at one edge which flanges are assembled face to face and secured together to form a stiffening rib across the plate, and wherein one of the sections is formed with an imperforate continuous curved over portion running along one transverse edge capable of seating upon and forming a liquid sealing lip against one of the transverse bars of the travelling band.

3. Screening and filtering apparatus for liquids, comprising in combination, a chain built up of articulated side links and cross bars which separate the links on one side from those on the other, perforated metal plates secured to the side links of the chain and extending over the spaces between the cross bars, one end of each complete plate being imperforate and continuously curved or arched in section so as to form a lip, said lip seating against one of said bars and the other end of each plate being plain and arranged to lie against the convex side of the lip of the next adjacent plate, each of said metal plates being further made in two sections, each finishing in a deep flange and being united by securing the flanges face to face to form a strengthening rib running transversely of the plate between the curved lip aforesaid and the plain edge.

4. In an apparatus of the kind described, in combination with laterally spaced side chains comprising links and bars extending between the links of said chains and providing the pivotal connection between said links, a plate member positioned between said chains and adjacent bars and having openings therein, means for connecting the side portions of each plate member in supporting relation from associated chain links and means providing a transverse stiffening rib on the rear face of said plate, the ends of said plates being so formed that opposite ends of adjacent plates are arranged in a curved overlapping sealing engagement with respect to an associated bar and with respect to each other.

5. In an apparatus of the kind described, in combination with laterally spaced side chains comprising links and bars extending between the links of said chains and providing the pivotal connection between said links, a plate member positioned between said chains and adjacent bars, each plate member comprising a plurality of perforated plate sections having connected together inner end flanges providing a rib on the rear face of the plate member, and means for connecting the side portions of both sections of each plate member in supporting relation from associated chain links, the outer end portions of each plate member being so formed that opposite ends of adjacent plate members are arranged in a curved overlapping sealing arrangement with respect to an associated bar and with respect to each other.

6. In an apparatus of the kind described, in combination with laterally spaced side chains comprising links and bars extending between the links of said chains and providing the pivotal connection between said links, a plate member positioned between said chains and adjacent bars and having openings therein, means for connecting the side portions of each plate member in supporting relation from associated chain links, and means providing a transverse stiffening rib on the rear face of each plate member, one end of each plate member being formed to provide transversely extending curved portion whereby said one end portion of said plate member partially surrounds an associated bar and the other end portion of an adjacent plate member being arranged to engage against the convexed side of the curved portion of said first mentioned plate member to there provide a seal.

7. In an apparatus of the kind described, in combination with laterally spaced side chains comprising links and bars extending between the links of said chains and providing the pivotal connection between said links, a plate member positioned between said chains and adjacent bars, each plate member comprising a plurality of perforated plate sections having connected together inner end flanges providing a rib on the rear face of the plate member, an angle bar fixed to each link and to the adjacent sides of the sections of each plate member for connecting both sections of each plate member in supporting relation from associated chain links, the ends of said plate members being so formed that opposite ends of adjacent plate members are arranged in a curved overlapping sealing engagement with respect to said bar and to each other.

8. A screening plate for a screening and filtering apparatus comprising perforate plate sections, each having a transverse flange at one end and which flanges are secured together on one side of the plate to provide a stiffening rib, the other end of one plate section being formed to provide a transversely extending portion of curved cross section, and the other end of the other plate section being straight.

9. A screening plate for a screening and filtering apparatus comprising perforate plate sections, each having a transverse flange at one end and which flanges are secured together on one side of the plate to provide a stiffening rib, the other end of one plate section being formed to provide a transversely extending portion of substantially semi-circular cross section, and the other end of the other plate section being straight.

FRANCIS WHITWELL BRACKETT.